United States Patent
Dichek et al.

(10) Patent No.: US 10,160,548 B2
(45) Date of Patent: Dec. 25, 2018

(54) APPARATUSES AND METHODS FOR ANTI-ICING OF SPEED MEASUREMENT PROBES

(71) Applicant: The Boeing Company, Chicago, IL (US)

(72) Inventors: Daniel Jonathan Gunnar Dichek, Seattle, WA (US); Vyacheslav Khozikov, Bellevue, WA (US); Jonathan Morrow, Everett, WA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 14/987,318

(22) Filed: Jan. 4, 2016

(65) Prior Publication Data

US 2017/0190431 A1  Jul. 6, 2017

(51) Int. Cl.
*B64D 15/12* (2006.01)
*B64D 43/02* (2006.01)
*G01P 5/165* (2006.01)

(52) U.S. Cl.
CPC .......... *B64D 15/12* (2013.01); *B64D 43/02* (2013.01); *G01P 5/165* (2013.01)

(58) Field of Classification Search
CPC .......... B64D 15/12; B64D 43/02; G01P 5/165
See application file for complete search history.

(56) References Cited

U.S. PATENT DOCUMENTS

| 5,062,869 | A | * | 11/1991 | Hagen | ............... G01P 5/165 96/420 |
| 7,175,136 | B2 | | 2/2007 | Shah et al. | |
| 7,628,359 | B2 | | 12/2009 | Shah et al. | |
| 7,965,201 | B2 | | 6/2011 | Shah et al. | |
| 9,463,879 | B2 | * | 10/2016 | Khozikov | ............... B64D 15/12 |
| 2015/2600047 | | | 9/2015 | Gieras et al. | |

FOREIGN PATENT DOCUMENTS

| EP | 2292514 A2 | 3/2011 |
| EP | 2915748 A1 | 9/2015 |
| GB | 541684 A | 12/1941 |
| JP | 2000077176 A | 3/2000 |
| JP | 2001278195 A | 10/2001 |

OTHER PUBLICATIONS

Sneha Lakshmi et al., "Pitot-Tube Heating in Aircrafts by Skin Effect", International Journal of Students Research in Technology & Management vol. 1 (04), Aug. 2013, ISSN, 2321-2543, p. 456-464.
Exentended European Search Report for copending European Application No. 161940473.9-1568; dated Dec. 8, 2016, 8 pages.
EPO Form 2906 for copending European Application No. 16 194 073.9-1022; dated Jun. 3, 2018; 8 pages.

* cited by examiner

*Primary Examiner* — Brian M O'Hara
(74) *Attorney, Agent, or Firm* — Joseph F. Harding; The Small Patent Law Group LLC

(57) ABSTRACT

A de-icing system is provided that includes a member, a coil, and a power supply. The member includes an anti-icing portion. The coil is inductively coupled to the anti-icing portion of the member. The power supply is coupled to the coil, and is configured to provide voltage to the coil. The coil emits electromagnetic energy responsive to power supplied by the power supply. Responsive to the electromagnetic energy, eddy currents are generated in the anti-icing portion that provide heating of the anti-icing portion.

19 Claims, 6 Drawing Sheets

APPARATUSES AND METHODS FOR ANTI-ICING OF SPEED MEASUREMENT PROBES

FIELD OF EMBODIMENTS OF THE DISCLOSURE

Embodiments of the present disclosure generally relate to de-icing systems, for example one or more portions of a pitot tube used to measure speed of an aircraft.

BACKGROUND OF THE DISCLOSURE

Pitot tubes may be utilized to measure the speed of an aircraft. However, ice may accumulate in one or more portions of the pitot tube, affecting the accuracy of the speed determination. Additionally, accumulated ice may increase drag of the aircraft.

SUMMARY OF THE DISCLOSURE

Accordingly, improvement of pitot tube performance and/or reduction of drag are provided in various embodiments disclosed herein.

Certain embodiments of the present disclosure provide a de-icing system. The de-icing system includes a member, a coil, and a power supply. The member (e.g., a member made in whole or in part of a smart suscepting alloy and/or ferromagnetic material) includes an anti-icing portion. The coil is inductively coupled to the anti-icing portion of the member. The power supply is coupled to the coil, and is configured to provide voltage to the coil. The coil emits electromagnetic energy responsive to power supplied by the power supply. Responsive to the electromagnetic energy, eddy currents are generated in the anti-icing portion that provide heating of the anti-icing portion.

Certain embodiments of the present disclosure provide a method. The method includes providing a member including an anti-icing portion. The method also includes inductively coupling a coil to the anti-icing portion of the member. Further, the method includes coupling a coil to a power supply. The power supply is configured to provide voltage to the coil. The coil emits electromagnetic energy responsive to power supplied by the power supply, and, responsive to the electromagnetic energy, eddy currents are generated in the anti-icing portion that provide heating of the anti-icing portion.

Certain embodiments of the present disclosure provide a method. The method includes providing a voltage to a coil from a power supply. The method also includes generating an eddy current responsive to the voltage in an anti-icing portion of a member inductively coupled to the coil. Further, the method includes providing heating to de-ice a surface of an aircraft via the eddy current.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for de-icing, for example, pitot tubes. Aircraft speed measurements probes may be sensitive to ice formation on internal and external surfaces under certain environmental conditions. Current approaches utilizing resistive heating may provide less than desired controllability and reliability. Various embodiments discussed herein provide effective and reliable energy delivery to surfaces for de-icing over an entire flight envelope. Induction heating technology may be employed to prevent ice formation. For example, induction coils powered by an electrical supply generate high frequency electromagnetic fields which are absorbed by a layer of a smart suscepting alloy. The fields are transformed into eddy currents on a surface including the smart suscepting alloy, with the current generating heat via ohmic losses to provide de-icing. Along with acceptable efficiency, various embodiments do not require direct contact between an induction coil and a heated surface.

Various embodiments utilize coils that operate at temperatures slightly higher than environmental temperatures, thereby avoiding, reducing, or minimizing cycling of heating and cooling of electrical wires. Such cycling may degrade properties of electrical insulation and wire itself. In various embodiments, a coil and a surface to be heated are coupled without contact, for example they may be separated by air, water, or other non-magnetic material. The separation between the coil and the surface to be heated also allows for sealing (e.g., hermetic sealing) of the coil and surface, preventing or reducing corrosion by preventing or reducing exposure to the environment. Additionally, a heating surface as utilized in various embodiments disclosed herein is more reliable than a heating wire, as the surface is not susceptible to single-point failures as is a wire. A heating surface (e.g., a heating surface including a smart susceptible alloy as discussed herein) is more robust than a heating wire, for example because the surface will still provide heat even if a portion of the surface is damaged. In contrast, a heating wire, if damaged at one point, may not continue to provide heat.

Figure 1:
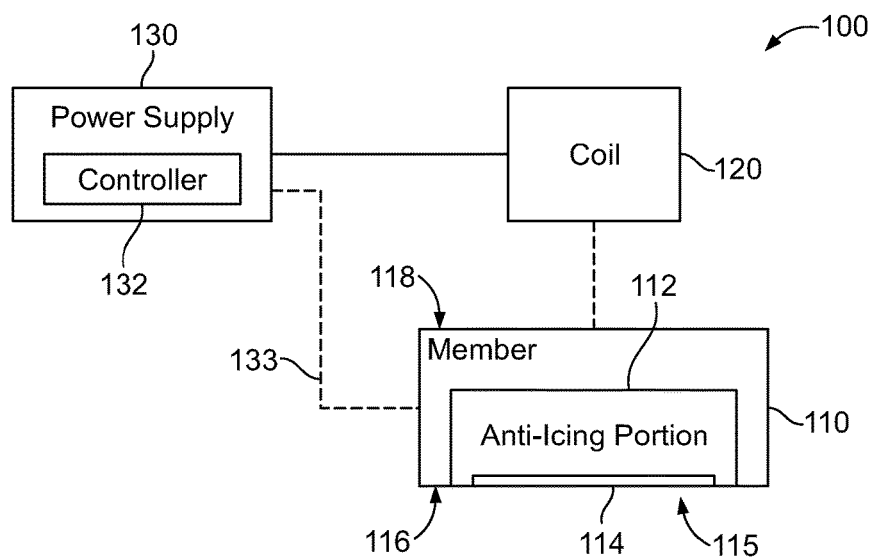
FIG. 1 provides a schematic view of a de-icing system in accordance with various embodiments.

FIG. 1 provides a schematic view of a de-icing system 100 in accordance with various embodiments. In the illustrated embodiment, the de-icing system 100 includes a member 110, a coil 120, and a power supply 130. Generally, the power supply 130 provides electrical energy, for example a voltage, to the coil 120. Responsive to the power supplied from the power supply 130, the coil 120 emits electromagnetic energy. Responsive to the electromagnetic energy emitted by the coil 120, eddy currents are generated in the member 110 (e.g., in an anti-icing portion 112 of the member 110), with the eddy currents providing heating to the anti-icing portion 112 that may be used to de-ice at least a portion of the member 110.

In the illustrated embodiment, the member 110 includes an anti-icing portion 112. It may be noted that, for ease of illustration, only one anti-icing portion 112 is depicted in FIG. 1; however, multiple anti-icing portions 112 may be utilized in various embodiments. The anti-icing portion 112 may include or be positioned proximate to one or more exterior surfaces of an aircraft. For example, the anti-icing portion 112 may include a support of a pitot tube, one or more of an air, static, or pressure intake portions of a pitot tube, or a surface or surfaces of a pitot chamber, among others. In various embodiments, the anti-icing portion 112 includes an anti-icing heating surface 114. Generally, the anti-icing heating surface 114 includes a material that is heated responsive to the electromagnetic energy provided by the coil 120. The anti-icing heating surface 114, for example, may have a magnetic susceptibility sufficient to generate eddy currents under the influence of the electromagnetic field generated by the coil 120. In the illustrated embodiment, the anti-icing heating surface 114 includes a smart suscepting alloy 115. A smart suscepting alloy as used herein may be understood to include alloys that have magnetic susceptibility between 10 and 10,000, and which lose magnetic susceptibility when a temperature approaches a specific Curie temperature, thereby helping to limit a maximum temperature to which the smart suscepting alloy 115 (and anti-icing heating surface 114) may be heated. The smart suscepting alloy 115, for example, may be a nickel alloy. Examples of smart suscepting alloys that may be used in various embodiments include Inconel 102 or Inconel 104.

In the illustrated embodiment, the member 110 includes a first side 116 and a second side 118. The first side 116 is disposed opposite the second side 118. The anti-icing portion 112 (and anti-icing heating surface 114) are disposed proximate the first side 118. The member 110 is oriented with the second side 118 closer to the coil 120 than the first side 116. As seen in FIG. 1, the coil 120 and the anti-icing portion 112 are thus disposed on opposite sides of the member 110. In various embodiments, the smart suscepting alloy 115 may be positioned inside the anti-icing portion 112 and, with respect to the anti-icing heating surface 114, may be in direct contact with the anti-icing heating surface 114, or may be disposed in or near an opposite surface of the anti-icing portion 112 from the anti-icing heating surface 114. In some embodiments, a gap between the anti-icing heating surface 114 and a smart suscepting alloy 115 may be filled by a thermally stable and conducting adhesive or, as another example, by a different bonding material that provides sufficient heat transfer from the smart suscepting alloy 115 towards the anti-icing heating surface 114.

The coil 120 is inductively coupled (as represented by a dashed line in FIG. 1) to the member 110, for example to the anti-icing portion 112 of the member 110. For example, the coil 120 may be placed in close proximity with, but not in contact with, the member 110. Close proximity as user herein may be understood as sufficiently close for electromagnetic energy from the coil 120 to generate sufficient eddy currents in the anti-icing portion to heat the anti-icing portion 112 a desired or otherwise predetermined amount. The particular properties (e.g., size, location, configuration, arrangement, material used), for the coil 120 may be selected to cooperate with the smart suscepting alloy 115 to provide electromagnetic energy in a sufficient amount to provide a sufficient or desired amount of heating to the member 110 for de-icing of one or more desired locations (e.g., the anti-icing portion 112). In some embodiments, the coil 120 may be generally flat (e.g., coiled within a generally 2-dimensional configuration, such as a pan-cake configuration) for heating of a planar surface. In some embodiments, the coil 120 may be helically or cylindrically coiled (e.g., to surround a portion of a tube or to be inserted into a bore or opening of a tube).

The power supply 130 is coupled to the coil 120 (e.g., placed in electrical communication with the coil via a wire or cable). The power supply 130 provides energy or voltage to the coil 120. The voltage may be an alternating current (AC) voltage. In the illustrated embodiment, the power supply 130 includes a controller 132 configured to control the amount of voltage delivered to the coil 120. In some embodiments, the amount of voltage may be controlled based on a temperature sensed at one or more surfaces or portions to be de-iced. In some embodiments, the Curie temperature of a smart suscepting alloy may be utilized to limit the maximum temperature of a surface or portion to be heated. The power supplied by the power supply 130 to the coil 120, which is inductively coupled to the anti-icing portion 112, generates an electromagnetic field that generates eddy currents in the anti-icing portion 112 which are used to heat and de-ice the anti-icing portion 112.

As indicated herein, in some embodiments, the member 110 may be configured as a pitot tube of an aircraft. The pitot tube may have a support, a static cavity, and a pitot cavity. In some embodiments, the anti-icing portion 112 includes an anti-icing heating surface 114 that is disposed proximate a boundary of the pitot cavity. Alternatively or additionally, the anti-icing portion 112 may include an anti-icing heating surface 114 disposed proximate a leading edge of the support. In some embodiments, a feedback link 133 (represented by a dashed line in FIG. 1) between the member 110 and the controller 132 may be utilized to control energy supplied to the coil 120 from the power supply 130. For example, the feedback link 133 may include or be associated with a thermocouple, and, based on a temperature sensed and/or determined using the thermocouple, the controller 132 may adjust voltage, current, or power output sent to the coil 120.

Figure 2:
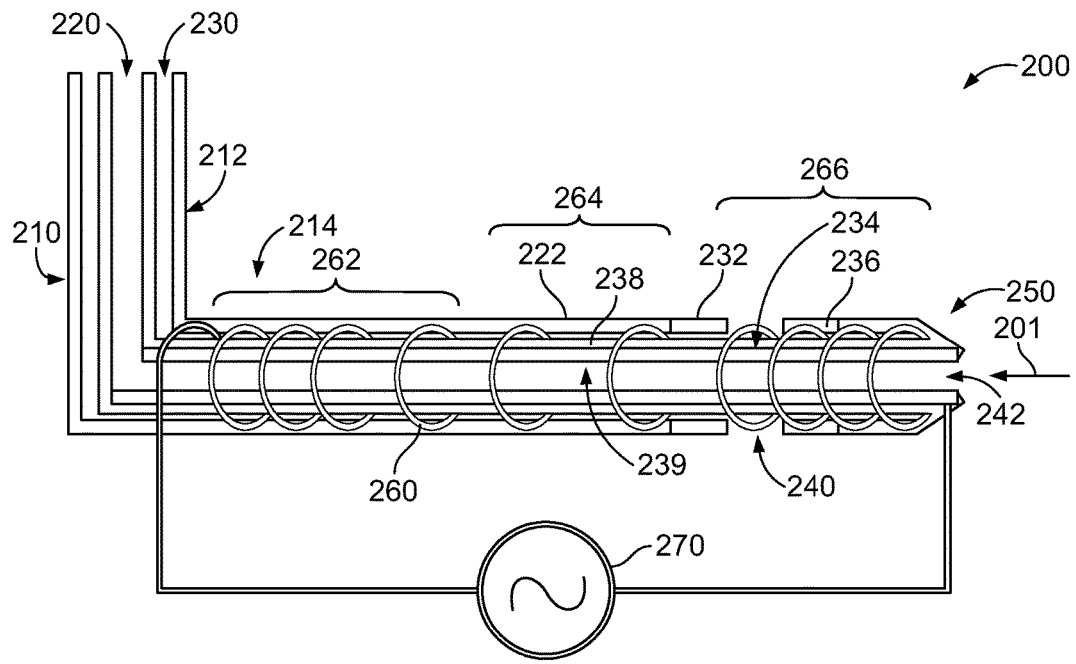
FIG. 2 provides a schematic view of a de-icing system including a pitot tube in accordance with various embodiments.

FIG. 2 provides a schematic view of a de-icing system 100 including a pitot tube 210, with anti-icing portions disposed proximate a border of the pitot tube 210 in accordance with various embodiments. The pitot tube 210 may be mounted to a portion of an airplane fuselage, for example on a wing, or as another example, on the front part of a fuselage of a large airplane. The pitot tube 210 includes a static chamber 230 having a static opening 240 and a pitot chamber 220 having a pitot opening 242. The pitot opening 242 receives a flow of ram air 201 (e.g., from the atmosphere as an aircraft is flying). The static opening 240 is disposed behind (relative to approaching air flow) a leading portion 250 of the pitot tube 210. In some embodiments, the static chamber 230 and the pitot chamber 220 are operably coupled to a pressure difference meter (not shown), with the difference in pressure between the static chamber 230 and the pitot chamber 220 used to determine a velocity of an aircraft. The depicted pitot tube 210 includes a support portion 212 configured to be coupled to an aircraft and an inlet portion 214 oriented in to an airstream. In the illustrated embodiment, the support portion 212 and inlet portion 214 are generally perpendicular to each other.

In the illustrated embodiment, the static chamber 220 includes a wall 222 that includes a first de-icing portion 232 and a second de-icing portion 236 on either side of the static opening 240. For example, the first de-icing portion 232 and second de-icing portion 236 (as well as other de-icing portions discussed herein) may include a smart suscepting alloy in either a solid, continuous form, or as a deposited layer on a substrate. As another example, a de-icing portion may include a smart suscepting alloy that is embedded in a ceramic material.

The pitot tube 210 includes a wall 238 that defines a boundary 239 of the pitot tube 210. The pitot tube 210 also includes a third de-icing portion 234. In the illustrated embodiment, the third de-icing portion 234 is shown as a generally cylindrical structure disposed radially inward of the wall 238. In other embodiments, the third de-icing portion 234 may be radially outward of wall 238 and/or sandwiched between opposing walls on either side of the third de-icing portion.

The system 200 also includes a coil 260, portions of which are helically wrapped about the pitot cavity 220 or otherwise disposed about the pitot cavity 220 in a generally cylindrical fashion. The coil 260 in various embodiments is disposed radially outward of the pitot cavity 220 and the third de-icing portion 234. In the depicted embodiment, for ease of illustration, the coil 260 is depicted as centrally disposed in the static cavity 230; however, in practice the coil 260 may be proximate to, adjacent to, or embedded in a wall defining the static cavity 220 and/or the pitot cavity 230. The coil 260 is operably coupled to the power supply 270, for example via a 38-40 American Wire Gauge (AWG) Litz wire. The coil 260 may also be formed, for example, from 38-40 AWG Litz wire. It may be noted that in, different embodiments, the particular gage may be smaller or larger than AWG 38-40, based on the particular application. The coil 260 is inductively coupled to the first de-icing portion 232, the second de-icing portion 236, and the third de-icing portion 234. When the coil 260 is provided with electrical energy from the power supply 270, the coil 260 generates electromagnetic energy which in turn generates eddy currents in the first de-icing portion 232, the second de-icing portion 236, and the third de-icing portion 234 to which the coil 260 is inductively coupled, which heats the first de-icing portion 232, the second de-icing portion 236, and the third de-icing portion 234.

The coil 260 and/or the various de-icing portions may be configured to provide greater de-icing at specified locations (e.g., locations more likely to be affected by icing). For example, one or more de-icing portions (or portions thereof) may be disposed proximate locations more susceptible to icing. As another example, the coil 260 may be configured to provide a greater amount of electromagnetic energy to a portion (or portions) of one or more de-icing portions corresponding to locations more susceptible to icing. For example, in the illustrated embodiment, the coil 260 has a varying pitch, with a smaller pitch (or more tightly packed coils) in portion 262 and portion 266 than for portion 264. Portion 262 and portion 266 may be located proximate to one or more locations more susceptible to icing, with the greater electromagnetic energy provided by the smaller pitch providing more efficient distribution of electromagnetic energy to locations more susceptible to icing.

The system 200 may provide various advantages. For example, the system 200 may provide increased reliability of the heating element (e.g., smart suscepting alloy) and/or increased lifetime of a wiring structure. Because the de-icing portions are inductively coupled and do not need to pass a continuous current through the entire length of each de-icing portion, the de-icing portions may provide improved performance and reliability relative to a resistive heating scheme in case of damage to one or more portions of a de-icing portion. The coil 260 of the illustrated embodiment experiences an insignificant increase of temperature (e.g., relative to a resistive heating scheme), thereby avoiding or reducing thermal cycling of the coil 260. Corrosion-free materials may be used for most or all components of the system 200. Further, a relatively fixed temperature may be provided within the pitot tube. Additionally, lower power may be required than previous de-icing approaches. It may be noted that the system 200 may be configured to be electromagnetic interference (EMI) immune and benign, for example between 10 and 400 kHz. It may be noted that the power supply 270 may add additional weight to an aircraft (e.g., 1-2 pounds).

It may be noted that ice may also have a tendency to form on aerodynamic surface of pitot tubes. Generally, the icing of such surfaces may not significantly impact the speed measurements provided via pitot tubes, but may increase drag of an aircraft. Accordingly, by providing de-icing of aerodynamic surface of a pitot tube, drag may be reduced. Due to the generally insignificant surface area of pitot tubes relative to the overall size of an aircraft, aerodynamic surfaces of pitot tubes are generally configured to provide a minimal airflow resistance rather than to generate lift. Accordingly, a relatively thin geometry may be a goal of aerodynamic surface design for pitot tubes. To help de-ice such a surface, a smart suscepting alloy (e.g., a nickel based alloy as discussed herein) may be deposited or otherwise associated with an external aerodynamic surface of a pitot tube.

Figure 3A:
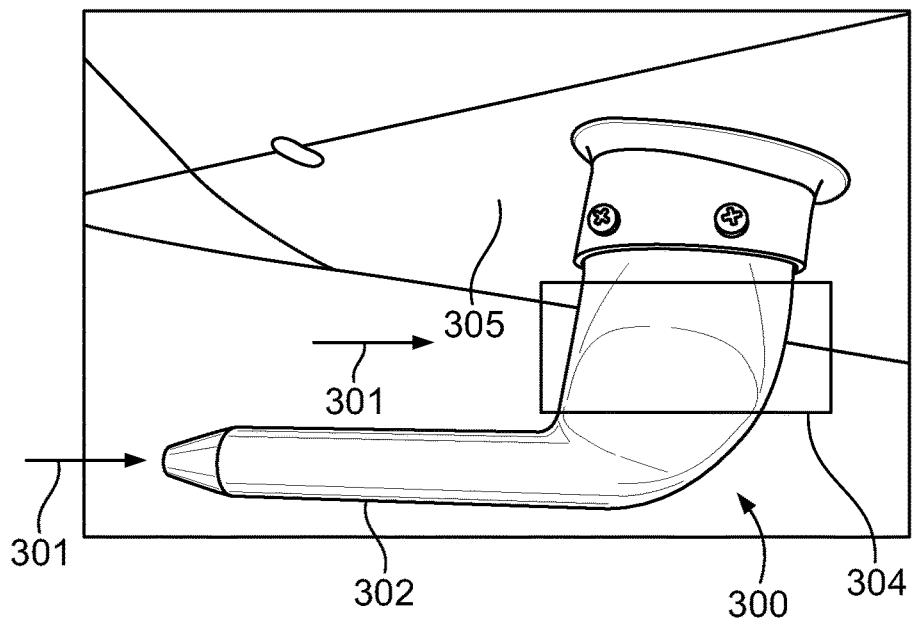
FIG. 3A depicts a de-icing system formed in accordance with various embodiments.
Figure 3B:
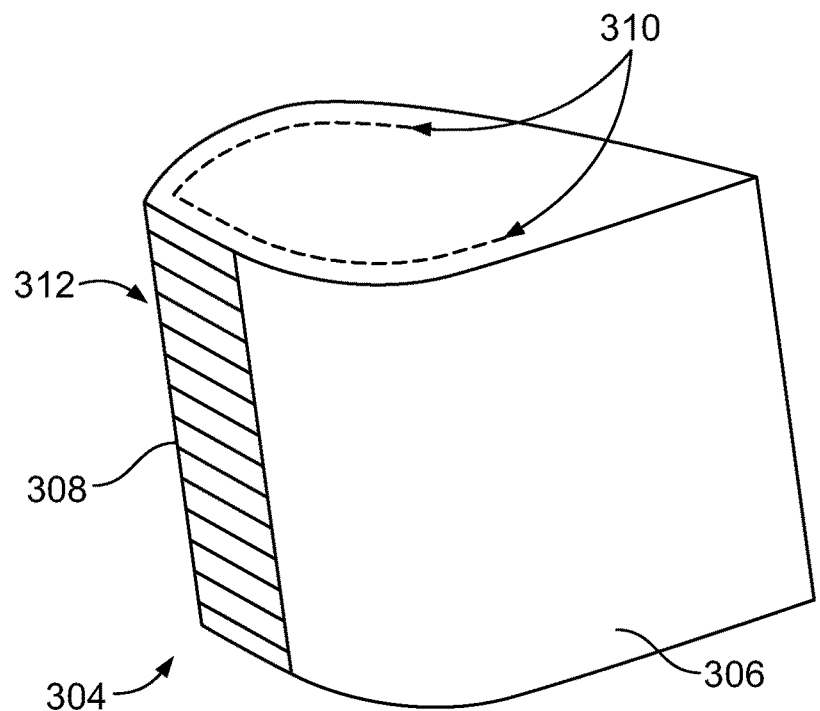
FIG. 3B depicts a support of the system of FIG. 3A

FIG. 3A depicts a de-icing system 300 formed in accordance with various embodiments, and FIG. 3B depicts a support 304 of the system of FIG. 3A. As seen in FIG. 3A, the system 300 includes a pitot tube 302 and support 304 that are exposed to ram air 301. The pitot tube 302 may be generally similar to the pitot tube 210 in various respects. The support 304 is configured to secure the pitot tube to the fuselage 305 of an aircraft in the depicted embodiment.

As seen in FIG. 3B, the support 304 includes a body 306 having a leading edge 308 (e.g., a leading edge with respect to the ram air flow 301). A de-icing portion 312 (e.g., a portion of an external surface of the body 306 including a smart suscepting alloy) is disposed on an exterior portion of the body 306. For example, the de-icing portion 312 may extend an inch on either side of the leading edge 308. The support 304 also includes coils 310 disposed on an interior of the body 306. Electromagnetic energy from the coils 310 may be used to head the de-icing portion 312. The coils 310, may be formed, for example, from Litz wire. The coils 310 may receive electrical energy from a power supply (not shown in FIG. 3B).

Generally, in various embodiments, high frequency currents flow through Litz wire of the coil 310, and generate an electromagnetic field that is absorbed by a smart suscepting alloy of the de-icing portion 312, which are transformed into high frequency eddy currents. The currents heat the de-icing portion 312 up to a Curie point of the smart suscepting alloy (e.g., 800 degrees Fahrenheit) in a relatively short amount of time. The coupling between the coil 310 and the de-icing portion 312 may be relatively high, providing a system efficiency of 90% or higher.

The coils 310 may have a flat or pancake design. For example, for heating an aerodynamic surface of the support 302, a coil current density to generate 15 W/inch$^2$, of about 37 Amp/inch, may be provided. Coils, for instance, may be made with 38 mil diameter 125/42 Litz wire with a weight of 0.3 pounds/foot. As one example, 10 parallel circuits of Litz wire may be provided, with 30 turns/inch of an inner portion, 10 turns/inch of an intermediate portion, and 7 turns/inch for the remainder of a pad or pancake defined by a coil 310.

Figure 4:
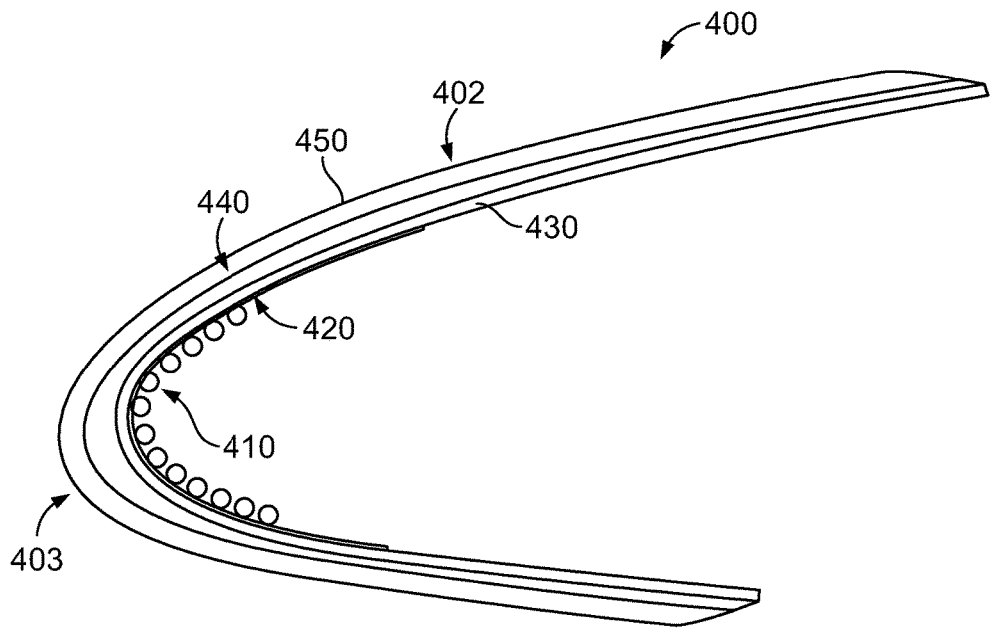
FIG. 4 depicts a plan view of a system for heating an aerodynamic surface of support in accordance with various embodiments.

FIG. 4 depicts a plan view of a system 400 for heating an aerodynamic surface 403 of support 402 in accordance with various embodiments. The system 400 includes coils 410, a panel 420, a separating layer 430, an anti-icing portion 440, and an external surface 450. The panel 420 is interposed between the separating layer 430 and the anti-icing portion 440, and may be used to mount and/or support the coils 410. The panel and the separating layer 430 in the illustrated embodiment are made from substantially non-magnetic materials. The anti-icing portion 440, which may be made from a smart suscepting alloy, is interposed between the separating layer 430 and the external surface 450. The external surface 450 may be made from a thermally conductive material (e.g., aluminum) and used to provide protection from the external atmosphere to the anti-icing portion 440, while still allowing a sufficient amount of heat from the anti-icing portion 440 to de-ice exterior portions of the support 402.

Figure 5:
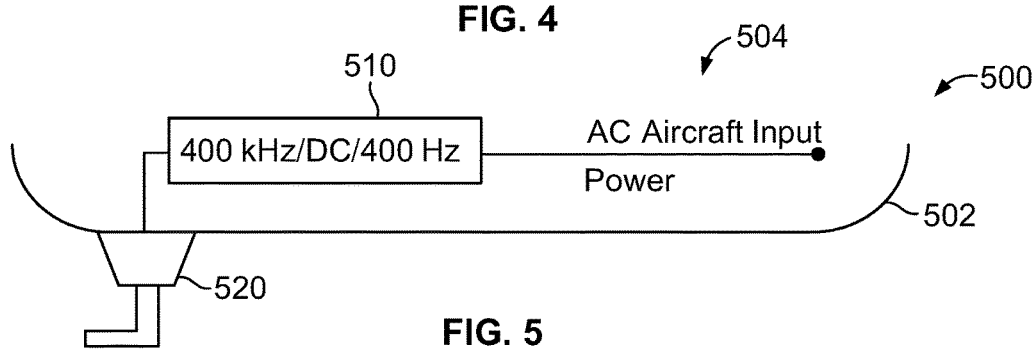
FIG. 5 illustrates a schematic view of a de-icing system formed in accordance with various embodiments.
Figure 6:
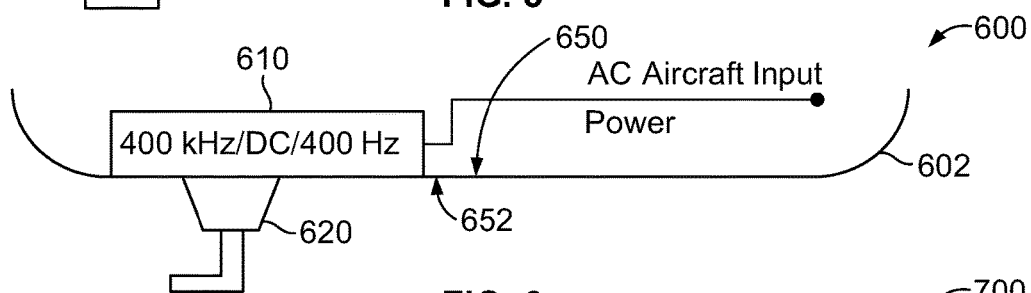
FIG. 6 illustrates a schematic view of a de-icing system formed in accordance with various embodiments.
Figure 7:
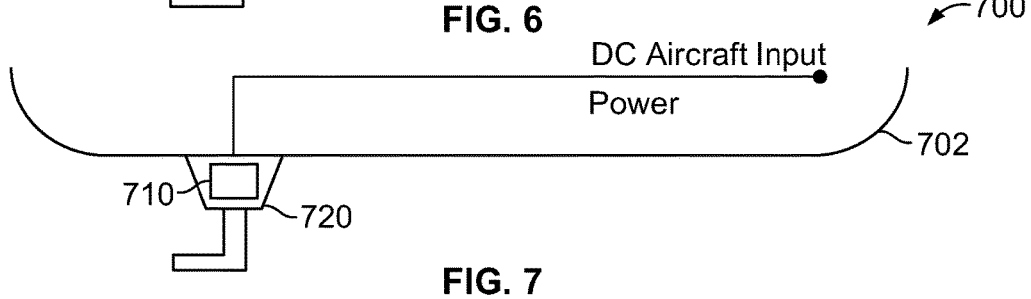
FIG. 7 illustrates a schematic view of a de-icing system formed in accordance with various embodiments.

FIGS. 5-7 illustrate various embodiments of the placement of power supplies for de-icing systems as discussed herein. FIG. 5 illustrates a schematic view of a de-icing system 500 formed in accordance with various embodiments. In the system 500, a power converter is provided inside a pressurized zone of an aircraft. As seen in FIG. 5, an aircraft 502 includes a pressurized zone 504. Alternating current (AC) Aircraft power may be input, for example, within the range of about 100-1000 Watts. The power is received by power converter 510 and then provided to pitot tube 520 (e.g., coils inductively coupled to one or more anti-icing portions of the pitot tube 520 as discussed herein). The power converter 510, for example, may be a 400 kHz/DC/400 Hz converter. The power converter 510, for example, may be used with a plurality of pitot tubes coupled to the power converter via wiring disposed in an interior of the aircraft 502.

FIG. 6 illustrates a schematic view of a de-icing system 600 formed in accordance with various embodiments. In the system 600, a power converter 610 is disposed on interior surface 650 of an aircraft 602 that is located opposite of an exterior surface 652 to which the pitot tube 620 is mounted. Alternating current (AC) Aircraft power is input. The power is received by the power converter 610 and then provided to the pitot tube 620 (e.g., coils inductively coupled to one or more anti-icing portions of the pitot tube 620 as discussed herein). The power converter 610, for example, may be a 400 kHz/DC/400 Hz converter.

FIG. 7 illustrates a schematic view of a de-icing system 700 formed in accordance with various embodiments. In the depicted system 700, DC aircraft input power within the range of about 100-1000 Watts is provided from an aircraft 702 to a DC/AC inverter 710 disposed within a pitot tube 720.

Figure 8:
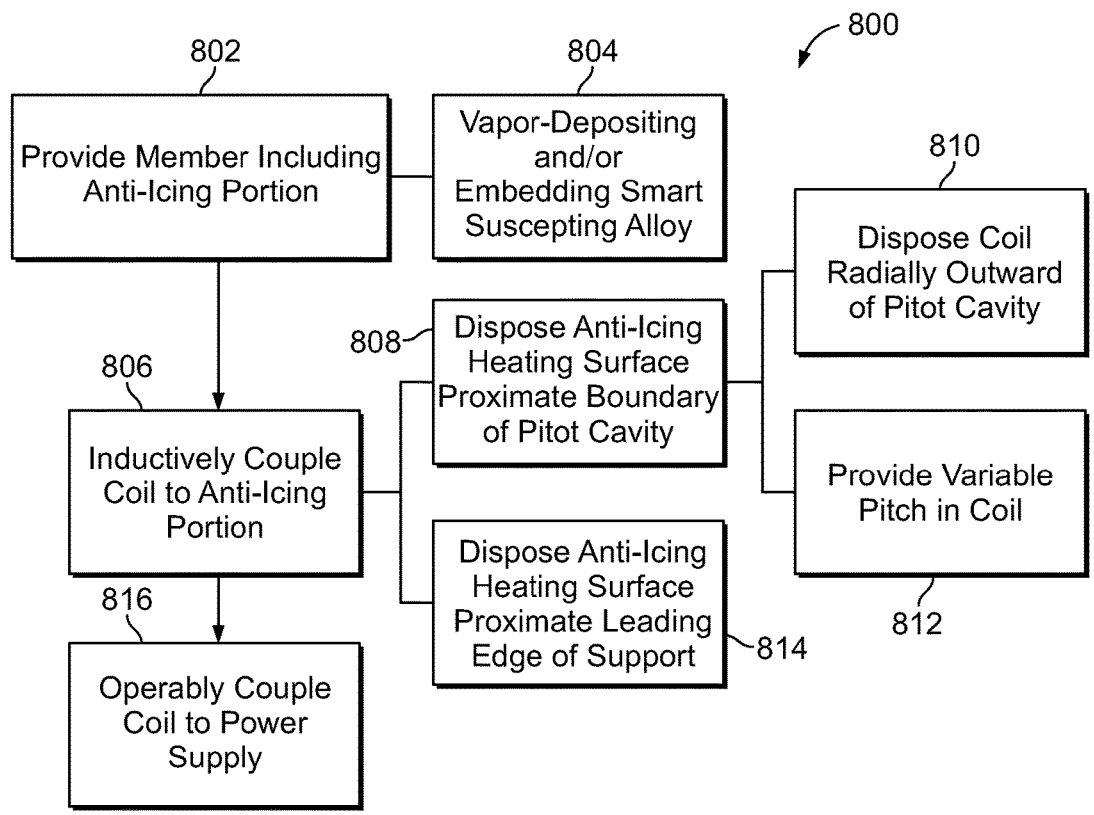
FIG. 8 provides a flowchart of a method according to an embodiment of the present disclosure.

FIG. 8 provides a flowchart of a method 800 (e.g., for providing a de-icing system), in accordance with various embodiments. The method 800, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 802, a member (e.g., member 110) is provided that includes an anti-icing portion (e.g., anti-icing portion 112). The anti-icing portion, for example, may include an anti-icing heating surface made from or including a smart suscepting alloy as discussed herein. In some embodiments, providing the member includes, at 804, vapor depositing a smart suscepting alloy on an anti-icing portion, electroplating to deposit the smart suscepting alloy, and/or embedding the smart suscepting alloy in the anti-icing portion.

At 806, a coil (e.g., coil 120) is inductively coupled to the anti-icing portion of the member. The coil, for example, may be placed in close proximity, but not contact, with the member. The coil may be helically wrapped, for example, about a pitot cavity or otherwise disposed about the pitot cavity in a generally cylindrical fashion. As another example, the coil may be formed as a pad or pancake and placed in proximity to an aerodynamic surface of a pitot tube support.

In some embodiments, inductively coupling the coil to the anti-icing portion includes, at 808, disposing an anti-icing heating surface of the anti-icing portion proximate a boundary of a pitot cavity. For example, at 810, the coil may be disposed radially outward of the pitot cavity. Alternatively or additionally, at 812, a variable pitch may be provided in the coil. In some embodiments, inductively coupling the coil to the anti-icing portion includes, at 814, disposing an anti-icing heating surface of the anti-icing portion proximate a leading edge of a support of a pitot tube.

At 816, the coil is operably coupled to a power supply (e.g., power supply 130). The power supply is configured to provide voltage to the coil, wherein the coil emits electromagnetic energy responsive to power supplied by the power supply. Responsive to the electromagnetic energy, eddy currents are generated in the anti-icing portion that provide heating of the anti-icing portion.

Figure 9:
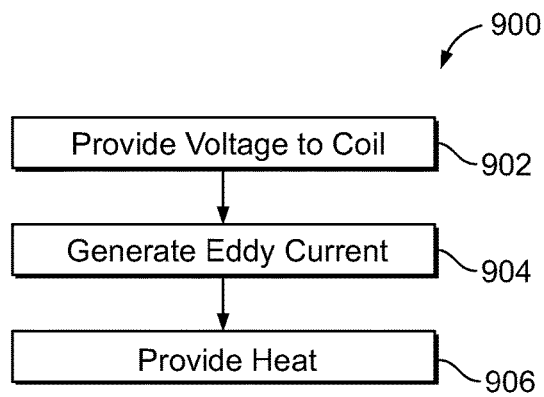
FIG. 9 provides a flowchart of a method according to an embodiment of the present disclosure.

FIG. 9 provides a flowchart of a method 900 (e.g., for de-icing one or more surfaces), in accordance with various embodiments. The method 900, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. The method 900, for example, may be performed during operation of an aircraft.

At 902, a voltage is provided to a coil (e.g., coil 120) from a power supply (e.g., power supply 130). At 904, an eddy current is generated responsive to the cycling voltage in an anti-icing portion of a member (e.g., member 110) inductively coupled to the coil. For example, the anti-icing portion may include or be formed of a smart suscepting alloy as discussed herein. At 906, heating is provide to de-ice a surface of an aircraft via the eddy current. For example, heating may be provided to a surface proximate to a pitot cavity or channel of a pitot tube and/or to an aerodynamic surface of a pitot tube support.

Figure 10:
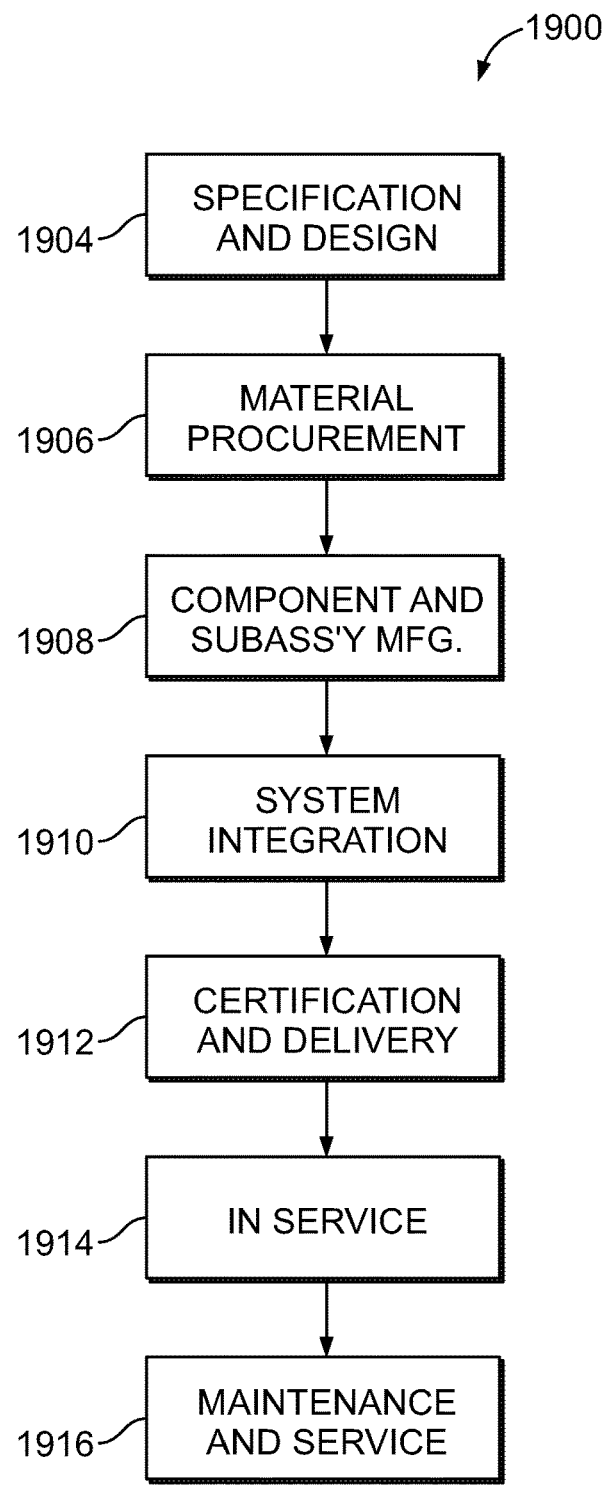
FIG. 10 is a block diagram of aircraft production and service methodology.
Figure 11:
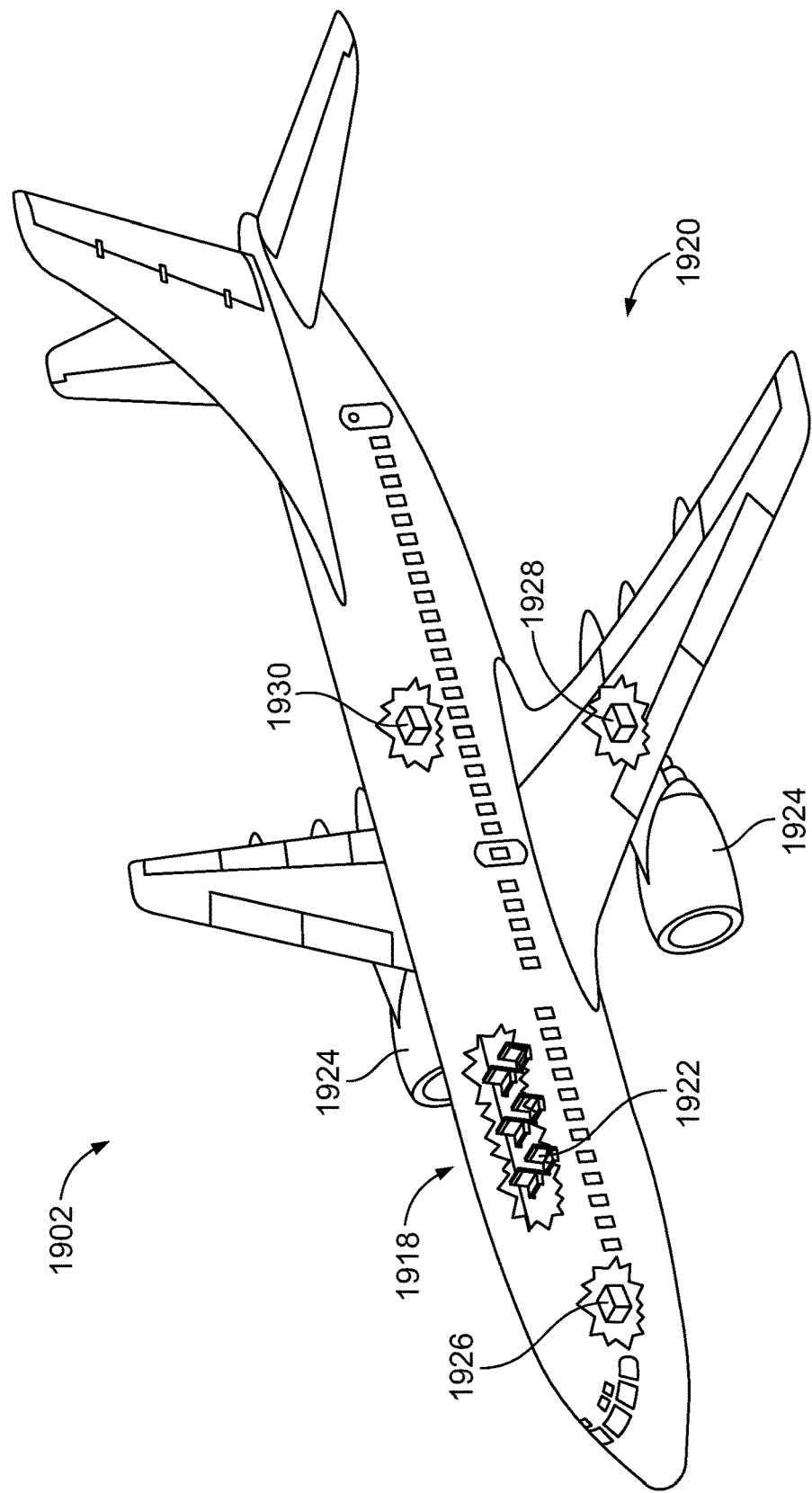
FIG. 11 is a schematic illustration of an aircraft.

Examples of the present disclosure may be described in the context of aircraft manufacturing and service method 1900 as shown in FIG. 10 and aircraft 1902 as shown in FIG. 11. During pre-production, illustrative method 1900 may include specification and design (block 1904) of aircraft 1902 and material procurement (block 1906). During production, component and subassembly manufacturing (block 1908) and system integration (block 1910) of aircraft 1902 may take place. Thereafter, aircraft 1902 may go through certification and delivery (block 1912) to be placed in service (block 1914). While in service, aircraft 1902 may be scheduled for routine maintenance and service (block 1916). Routine maintenance and service may include modification, reconfiguration, refurbishment, etc. of one or more systems of aircraft 1902. For example, in various embodiments, examples of the present disclosure may be used in conjunction with one or more of blocks 1908, 1910, or 1916.

Each of the processes of illustrative method 1900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 1902 produced by illustrative method 1900 may include airframe 1918 with a plurality of high-level systems 1920 and interior 1922. Examples of high-level systems 1920 include one or more of propulsion system 1924, electrical system 1926, hydraulic system 1928, and environmental system 1930. Any number of other systems may be included. Although an aerospace example is shown, the principles disclosed herein may be applied to other industries, such as the automotive industry. Accordingly, in addition to aircraft 1902, the principles disclosed herein may apply to other vehicles, e.g., land vehicles, marine vehicles, space vehicles, etc. In various embodiments, examples of the present disclosure may be used in conjunction with airframe 1918.

Apparatus(es) and method(s) shown or described herein may be employed during any one or more of the stages of the manufacturing and service method 1900. For example, components or subassemblies corresponding to component and subassembly manufacturing 1908 may be fabricated or manufactured in a manner similar to components or subassemblies produced while aircraft 1902 is in service. Also, one or more examples of the apparatus(es), method(s), or combination thereof may be utilized during production stages 1908 and 1910, for example, by substantially expediting assembly of or reducing the cost of aircraft 1902. Similarly, one or more examples of the apparatus or method realizations, or a combination thereof, may be utilized, for example and without limitation, while aircraft 1902 is in service, e.g., maintenance and service stage (block 1916).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A de-icing system comprising:
a member including an anti-icing portion, the member comprising a pitot tube having a static cavity and a pitot cavity, the static cavity and the pitot cavity coupled to a pressure difference meter, wherein the static cavity radially surrounds the pitot cavity, the anti-icing portion including a cylindrically shaped portion;

a coil inductively coupled to the anti-icing portion of the member, wherein the coil inductively heats the cylindrically shaped portion of the anti-icing portion, wherein the coil is radially inward of a wall of the static cavity, a wall of the pitot cavity is radially inward of the coil, and the cylindrically shaped portion of the anti-icing portion is radially inward of the wall of the pitot cavity; and a power supply coupled to the coil, the power supply configured to provide voltage to the coil, wherein the coil emits electromagnetic energy responsive to power supplied by the power supply, wherein, responsive to the electromagnetic energy, eddy currents are generated in the anti-icing portion that provide heating of the anti-icing portion.

2. The system of claim 1, wherein the anti-icing portion includes an anti-icing heating surface comprising a smart suscepting alloy.

3. The system of claim 1, wherein the coil and the anti-icing portion are disposed on opposite sides of the member.

4. The system of claim 1, wherein the pitot tube comprises a support, the anti-icing portion comprising a portion that inductively heats a surface of the support.

5. The system of claim 1, wherein the coil has a varying pitch along an axis of the pitot cavity.

6. The system of claim 1, wherein the system comprises a flat coil, wherein the pitot tube comprises a support, the anti-icing portion comprising an anti-icing heating portion that is disposed proximate a leading edge of the support and that inductively heats a surface of the support via the flat coil.

7. The system of claim 1, wherein the pitot tube is configured to be disposed on an exterior of an aircraft, the power supply configured to be disposed in a pressurized area of an interior of the aircraft.

8. The system of claim 1, wherein the pitot tube is configured to be disposed on an exterior surface of an aircraft, wherein the power supply is disposed on an opposing interior surface of the aircraft.

9. The system of claim 1, wherein the pitot tube is configured to be disposed on an exterior of an aircraft, wherein the system further comprises an inverter inside the pitot tube, the inverter in electrical communication with a direct current (DC) input.

10. A method comprising:
providing a member including an anti-icing portion, the member comprising a pitot tube having a static cavity and a pitot cavity, the static cavity and the pitot cavity coupled to a pressure difference meter, wherein the static cavity radially surrounds the pitot cavity, the anti-icing portion including a cylindrically shaped portion;

inductively coupling a coil to the anti-icing portion of the member, wherein the coil inductively heats the cylindrically shaped portion of the anti-icing portion, wherein the coil is radially inward of a wall of the static cavity, a wall of the pitot cavity is radially inward of the coil, and the cylindrically shaped portion of the anti-icing portion is radially inward of the wall of the pitot cavity; and coupling a coil to a power supply, the power supply configured to provide voltage to the coil, wherein the coil emits electromagnetic energy responsive to power supplied by the power supply, wherein, responsive to the electromagnetic energy, eddy currents are generated in the anti-icing portion that provide heating of the anti-icing portion.

11. The method of claim 10, wherein the anti-icing portion includes an anti-icing heating surface comprising a smart suscepting alloy.

12. The method of claim 11, wherein providing the member includes at least one of vapor depositing the smart suscepting alloy on the anti-icing portion, electroplating to deposit the smart suscepting alloy, or embedding the smart suscepting alloy in the anti-icing portion.

13. The method of claim 10, wherein the pitot tube comprises a support, the anti-icing portion comprising a portion that inductively heats a surface of the support.

14. The method of claim 10, further comprising providing a variable pitch in the coil.

15. The method of claim 10, wherein the pitot tube comprises a support, the anti-icing portion comprising an anti-icing heating portion that inductively heats a surface of the support, the method comprising disposing the anti-icing heating portion proximate a leading edge of the support that is heated by a flat coil.

16. A method comprising:
providing a voltage to a coil from a power supply;
generating an eddy current responsive to the voltage in an anti-icing portion of a member inductively coupled to the coil, wherein the member comprises a pitot tube having a static cavity and pitot cavity, the static cavity and the pitot cavity coupled to a pressure difference meter, wherein the static cavity radially surrounds the pitot cavity, the anti-icing portion including a cylindrically shaped portion, wherein the coil is radially inward of a wall of the static cavity, a wall of the pitot cavity is radially inward of the coil, and the cylindrically shaped portion of the anti-icing portion is radially inward of the wall of the pitot cavity; interposed between the pitot cavity and the coil; and
providing heating to de-ice the cylindrically shaped portion via the eddy current.

17. The method of claim 16, wherein the anti-icing portion includes an anti-icing heating surface comprising a smart suscepting alloy.

18. The method of claim 16, wherein the anti-icing portion includes an anti-icing heating surface disposed proximate a boundary of the pitot cavity.

19. The method of claim 16, wherein the pitot tube comprises a support, the anti-icing portion including an anti-icing heating surface disposed proximate a leading edge of the support that is heated by a flat coil.

* * * * *